United States Patent [19]

Hallstrom, Jr.

[11] Patent Number: 4,966,275
[45] Date of Patent: Oct. 30, 1990

[54] RECIPROCATING CONVEYOR WITH DETACHABLE POWER DRIVE

[76] Inventor: Olof A. Hallstrom, Jr., 1920 Hallstrom Rd., Tillamook, Oreg. 97141

[21] Appl. No.: 302,555

[22] Filed: Jan. 27, 1989

[51] Int. Cl.⁵ .............................................. B65G 25/00
[52] U.S. Cl. .................................. 198/750; 414/525.1
[58] Field of Search ............................... 198/750, 775; 414/525.1, 525.9

[56] References Cited

U.S. PATENT DOCUMENTS

| | | | |
|---|---|---|---|
| 4,143,760 | 3/1979 | Hallstrom | 198/750 |
| 4,144,963 | 3/1979 | Hallstrom | 198/750 |
| 4,184,587 | 1/1980 | Hallstrom | 198/750 |
| 4,691,819 | 9/1987 | Hallstrom, Jr. | 198/750 |
| 4,709,805 | 12/1987 | Foster | 198/750 |
| 4,793,469 | 12/1988 | Foster | 198/750 |
| 4,899,870 | 2/1990 | Foster | 198/750 |

Primary Examiner—Joseph E. Valenza
Assistant Examiner—D. Glenn Dayoan
Attorney, Agent, or Firm—Olson & Olson

[57] ABSTRACT

A reciprocating conveyor comprised of a plurality of elongated, reciprocative, load-supporting slats mounted on a conveyor frame for reciprocative movement relative to the frame, is mounted detachably on an underlying support frame which carries integrally therewith a hydraulic drive mechanism arranged to releasably engage the load-supporting slats for reciprocating the latter on a predetermined sequence for moving a load in an off-loading or on-loading direction.

17 Claims, 3 Drawing Sheets

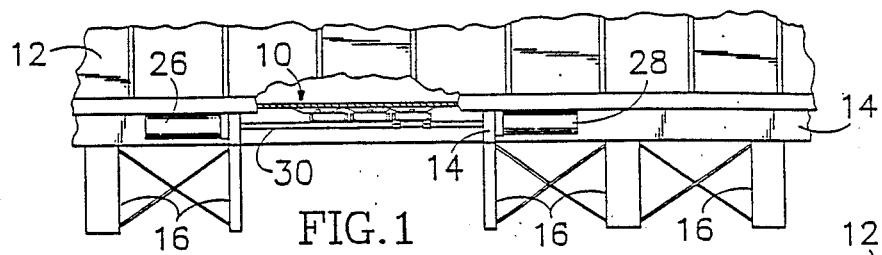
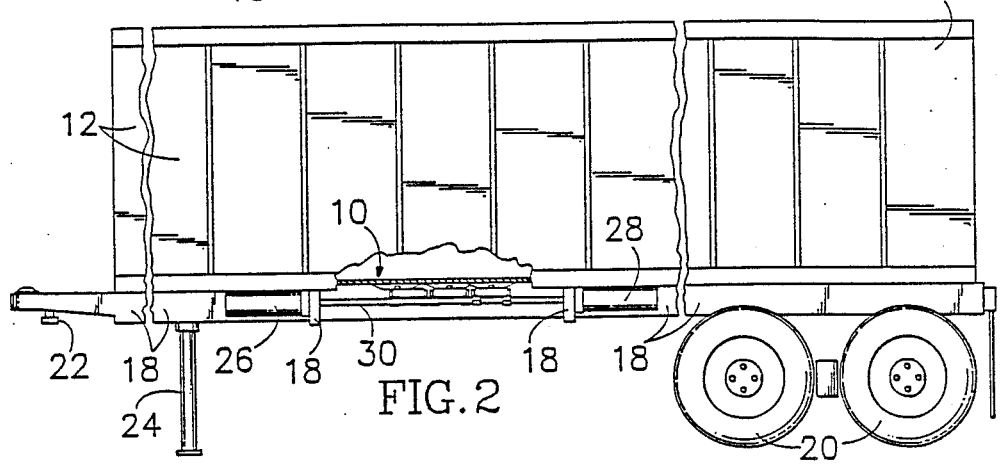
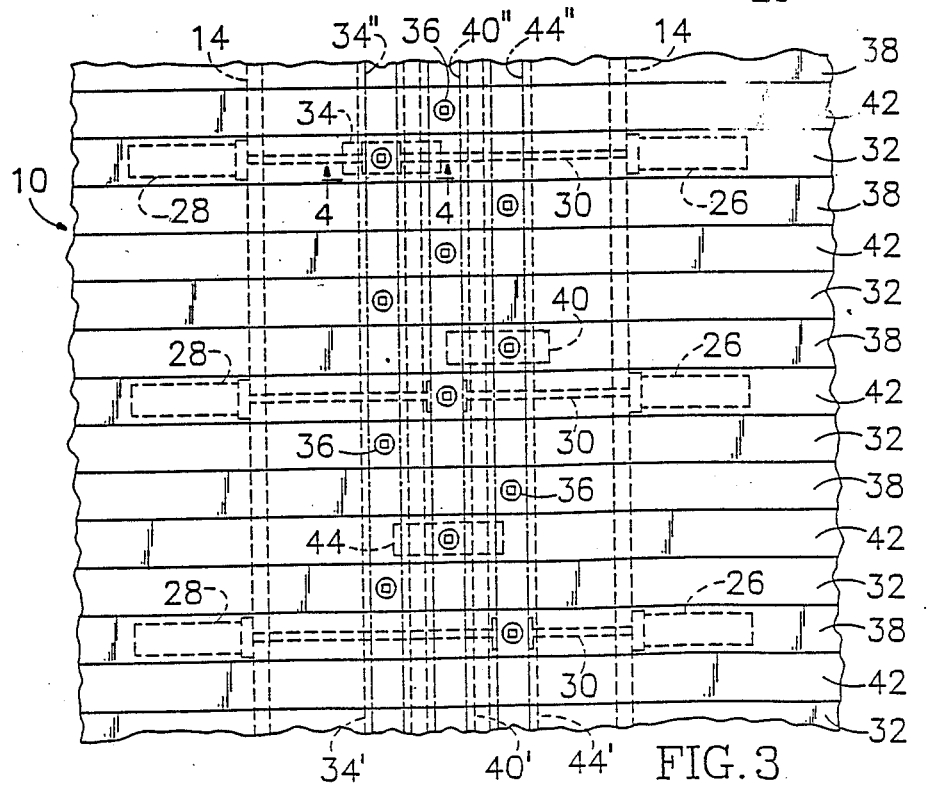

RECIPROCATING CONVEYOR WITH DETACHABLE POWER DRIVE

BACKGROUND OF THE INVENTION

This invention relates to reciprocating conveyors, and more particularly to a reciprocating conveyor that is detachable from an underlying stationary or mobile support which carries the power drive for the conveyor.

There are many circumstances in which it is desirable that a reciprocating conveyor be able to be disconnected from an underlying support for separate transport and for operation by a power drive that is usable with a plurality of the conveyors. For example, it is desirable from an economic standpoint that a plurality of containers having a reciprocating conveyor floor and confining side and end walls, be available for hauling garbage and the like from diverse locations to a site of disposal. At the disposal site the filled containers are mounted one at a time upon an underlying support and coupled to a power drive on the support for reciprocating the conveyor to off-load the contents of the container. The provision of a single power drive on the support avoids the cost involved in duplicating the power drive for each reciprocating conveyor floor.

As another example, the underlying support with integral power drive may be provided as a part of the framework of a mobile truck adapted to detachably mount a container having a reciprocating conveyor floor and confining side and end walls. A plurality of the containers may be filled with garbage or other product to be transported to one or more off-loading sites by mounting the containers one at a time on one of the mobile trucks.

The detachable mounting of a reciprocating conveyor on an underlying support containing the power drive for the conveyor, has not been provided heretofore.

SUMMARY OF THE INVENTION

In its basic concept, this invention provides a reciprocating conveyor configured for detachable mounting on an underlying support and for detachable coupling of the reciprocating conveyor to a power drive carried by the underlying support.

The principal objective of this invention is to provide for the detachable coupling of a reciprocating conveyor and an underlying support carrying the power drive for the reciprocating conveyor.

Another objective of this invention is the provision of a reciprocating conveyor and support and drive assembly of the class described in which the support and drive assembly is in the form of a stationary structure.

Another objective of this invention is the provision of a reciprocating conveyor and support and drive assembly of the class described in which the support and drive assembly is in the form of a mobile structure.

A further objective of this invention is to provide a recprocating conveyor and support and drive assembly of the class described which is of simplified construction for economical manufacture, maintenance and repair.

The foregoing and other objects and advantages of this invention will appear from the following detailed description, taken in connection with the accompanying drawings of preferred embodiments.

BRIEF DESCRIPTION OF THE DRAWINGS

FIG. 1 is a fragmentary view in side elevation of a portable container having a reciprocating conveyor floor and confining walls mounted detachably on an underlying stationary support structure, and coupled detachably to a power drive carried by the support structure, a portion being broken away to disclose internal structural details.

FIG. 2 is a foreshortened, fragmentary view in side elevation of a portable container having a reciprocating conveyor floor and confining walls mounted detachably on an underlying support structure which forms a part of the wheeled chassis of a trailer, and coupled detachably to a power drive carried by the mobile support structure, a portion being broken away to disclose internal structural details.

FIG. 3 is a fragmentary plan view of the reciprocating conveyor floor and drive mechanism of FIGS. 1 and 2.

DESCRIPTION OF THE PREFERRED EMBODIMENTS

Figure 4:
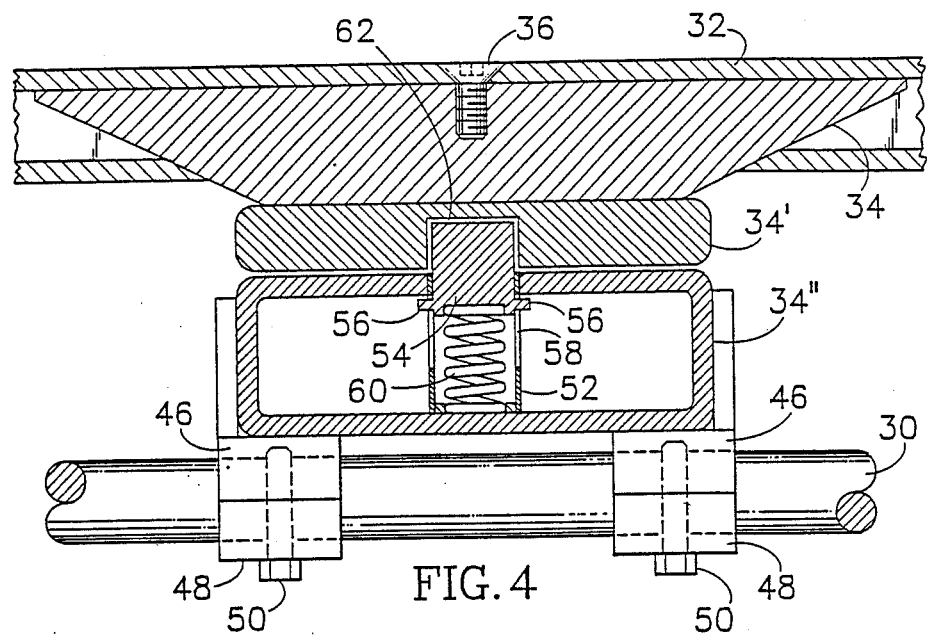
FIG. 4 is a fragmentary sectional view, on an enlarged scale, taken on the line 4—4 in FIG. 3, and showing the detachable coupling of the reciprocating conveyor floor to the power drive.

In FIG. 1 there is shown merely for purposes of illustration a portion of a portable container which includes a reciprocating conveyor floor 10 within confining side and end walls 12. The container is mounted detachably upon a stationary support structure which includes an elongated, horizontal framework of longitudinal and transverse frame members 14 mounted in elevated position on a plurality of longitudinally spaced vertical legs 16.

In FIG. 2 the portable container also includes a reciprocating conveyor floor 10 within confining side and end walls 12. In this embodiment the container is mounted detachably upon a mobile support which includes an elongated horizontal framework of longitudinal and transverse frame members 18 forming a part of the chassis of a trailer. Thus, the framework is supported upon rear wheels 20 and is provided at its front end with a fifth wheel coupler 22 and front support jacks 24.

In both FIGS. 1 and 2 there is illustrated a preferred form of power drive for the reciprocating conveyor floor. For a detailed description of the power drive, reference is made herein to my earlier U.S. Pat. No.

4,691,819. The power drive as illustrated includes a plurality of pairs of hydraulic piston-cylinder units. The cylinders 26 and 28 of each unit are mounted in longitudinally spaced apart position on spaced transverse frame members 14 or 18 (14 in FIG. 3) of the support framework. The pistons within the cylinders are connected together by a common piston rod 30.

FIG. 3 illustrates a portion of a type of reciprocating conveyor forming the container floor of FIGS. 1 and 2. A plurality of elongated conveyor slats are arranged side by side across the floor dimension. As illustrated, every third slat is connected to a common transversely elongated connector member. Thus, each of the slats 32 is secured to a connector shoe member 34, as by means of screws 36. Slats 38 are secured to connector shoe members 40 and slats 42 are secured to connector shoe members 44, in similar manner.

The connector shoe members 34 are welded or otherwise secured in spaced apart arrangement to an elongated transverse connector beam member 34'. Similarly, the connector shoe members 40 and 44 are secured to elongated transverse connector beam members 40' and 44', respectively.

The connector beams 34', 40' and 44' are arranged for detachable coupling to associated drive members 34", 40" and 44", respectively. In the embodiment illustrated, and best shown in FIG. 4, the drive member 34" is an elongated hollow box beam. It is secured to an associated piston rod 30 of a pair of hydraulic cylinders 26 and 28 by means of a pair of split clamps. The upper section 46 of each clamp is secured to the hollow box beam, as by welding, and a lower section 48 is secured to the upper section by bolts 50, with the piston rod clamped between the sections.

A latch sleeve 52 extends upwardly through the box beam 34" for slidably guiding therein a latch pin 54. A pair of laterally extending lugs 56 on the latch pin extend slidably through a pair of guide slots 58 in the sleeve to limit the extent of upward movement of the latch pin. A compression spring 60 extends between the underside of the latch pin and the bottom of the sleeve for urging the latch pin resiliently to its limit of upward extension from the beam 34".

A socket 62 in the underside of the connector beam 34' is configured for receiving the latch pin releasably therein, for detachably securing the connector beam 34' and associated shoes 34 and slats 32 to the drive member beam 34" for reciprocation therewith during operation of the associated hydraulic cylinders 26 and 28.

It will be understood that similar connector assemblies are provided for releasably coupling the slats 38 and 42 through their respective connector shoes 40 and 44 to their drive members 40" and 44".

The operation of the detachable assembly described hereinbefore is as follows: Let it be assumed that the container 10, 12 is separated from the underlying fixed support of FIG. 1, or the mobile support of FIG. 2. The container therefore is transported by crane or other mechanism to a position above the underlying support and then lowered upon it. Positive attachment of the container to the underlying support may be effected in any desired manner, such as by bolts extended between transverse or longitudinal frame components.

As the connector beams 34', 40' and 44' are lowered onto the drive member beams 34", 40" and 44", respectively, the latch pins 54 may or may not register with the latch sockets 62, since the drive member beams may be at any random positions relative to the transverse frame. If they do not register, they are depressed into the sleeves 52 against the compressive resistance of the coil springs 60. The drive mechanism then is activated to move the drive member beams 34", 40", and 44" relative to the overlying connector beams 34', 40' and 44', respectively, until the latch pins 54 are brought into registry with latch sockets 62. Thereupon the latch pins snap into the latch sockets by extension of the coil springs.

When it is desired to unload the contents of the container, the outfeed end wall of the container is opened and the drive cylinders 26 and 28 activated to reciprocate the conveyor slats 32, 38 and 42 in the appropriate manner to off-load the contents either to the right or to the left in FIG. 3.

It will be understood that the arrangement of conveyor slats and associated drive mechanisms may be selected from any of several systems. Illustrative of these are the systems described in my earlier U.S. Pat. Nos. 3,534,875; 4,143,760; and 4,144,963, and in my co-pending U.S. patent application, Ser. No. 110,165 filed 19 Oct. 1987 now U.S. Pat. No. 4,856,645 for RECIPROCATING CONVEYOR. For purposes of this invention, those systems need be modified only in providing detachable coupling between the slat connectors carried by the container and the drive assemblies carried by the fixed or mobile underlying support.

Figure 5:
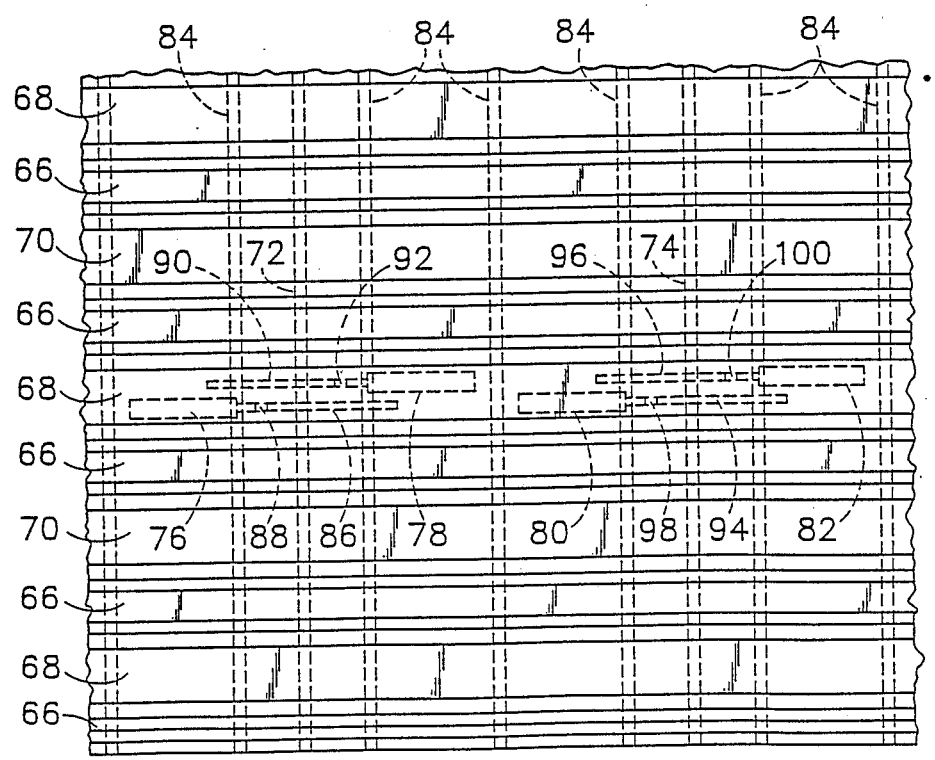
FIG. 5 is a fragmentary plan view of an alternative form of a reciprocating conveyor floor and drive mechanism embodying the features of this invention.
Figure 6:
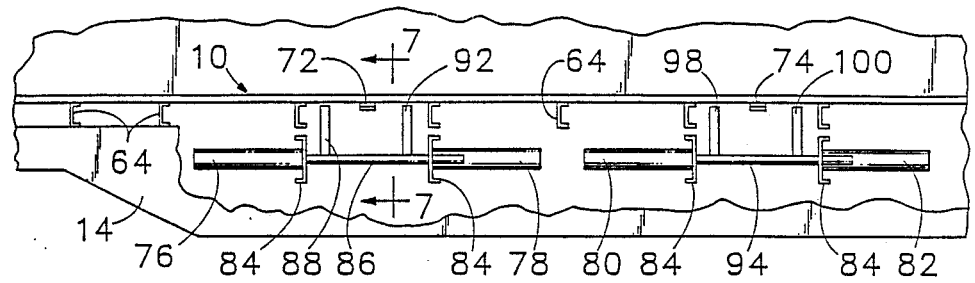
FIG. 6 is a fragmentary side elevation, as viewed from the bottom in FIG. 5, portions being broken away to disclose structural details which are shown in schematic form.
Figure 7:
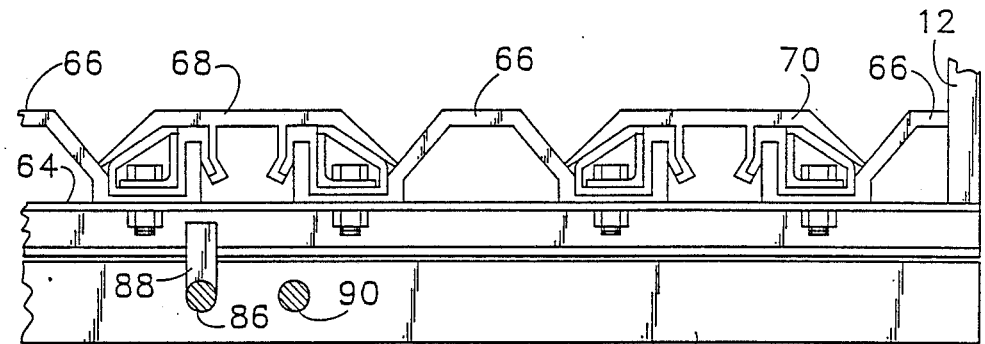
FIG. 7 is a fragmentary sectional view, on an enlarged scale, taken on the line 7—7 in FIG. 6.

FIGS. 5-7 illustrate a detachable coupling between the type of reciprocating conveyor disclosed in my co-pending application aforesaid and a drive mechanism carried by an underlying stationary or mobile support. For a detailed description of the reciprocating conveyor structure, reference is made to the co-pending application. For the purpose of this description, however, it is necessary only to identify the basic components, as follows:

A plurality of longitudinally spaced transverse frame members 64 support longitudinally extending laterally spaced apart fixed slats 66 provided with lateral extensions configured to mount and guide a plurality of reciprocative slats 68 and 70, positioned to opposite sides of the fixed slats. The reciprocative slats 68 are connected transverse drive beam 72 and the reciprocative slats 70 are connected to transverse drive beam 74.

The drive beams are connected to separate power drive mechanisms in such manner that both drive beams and their connected slats are moved simultaneously in the same direction for moving a load supported thereon. This is achieved because the load supporting area of both slats 68 and 70 is greater than the load supporting area of the fixed slats 66. Each of the slat drive beams 72 and 74 is moved in the opposite, retracting direction one at a time so as not to move the load in the retracting direction. This is achieved because the load supporting area of the retracting slats, for example slats 68, is less than the sum of the load supporting area of the fixed slats 66 and the load supporting area of the then stationary reciprocative slats, for example slats 70.

The drive mechanism illustrated includes a pair of hydraulic drive cylinders for each transverse slat connector and drive beam 72 and 74. Thus, cylinders 76 and 78 are associated with beam 72 and cylinders 80 and 82 are associated with beam 74. The cylinders are mounted upon transverse support frame members 84 of the conveyor support. The piston rod 86 of cylinder 76 extends slidably through aligned guide bores in adjacent frame members 84, and mounts a pusher arm 88 which is positioned on the side of beam 72 adjacent the cylinder 76.

Piston rod 90 of companion cylinder 78 extends slidably through aligned guide bores in the same frame members 84 and mounts pusher arm 92 which is positioned on the side of beam 72 adjacent the cylinder 78.

In similar manner, the piston rods 94 and 96 of cylinders 80 and 82, respectively, extend through aligned guide bores in adjacent support frame members 84. They mount pusher arms 98 and 100, respectively, which are positioned on opposite sides of the beam 74 adjacent their respective cylinders 80 and 82.

The pusher arms are shown in FIGS. 5 and 6 positioned closely adjacent their respective cylinders in the retracted position of their associated piston rods. Thus, companion pusher arms 88 and 92 are spaced apart to their maximum extent, as are their companion pusher arms 98 and 100. This provides maximum space between companion pusher arms into which the associated beams 72 and 74 may be placed, regardless of the degree of extension or retraction of the beams when the reciprocating conveyor floor is installed upon the support.

In describing the operation of the system of FIGS. 5-7, let it be assumed that the contents of the container is to be off-loaded by movement of the load to the right in FIG. 5. Accordingly, cylinders 76 and 80 are activated to extend their piston rods 86 and 94 toward the right. Their pusher arms 88 and 98 thus move into abutment with the left sides of the connector and slat drive beams 72 and 74 and move them toward the right. Since both sets of slats 72 and 74 are moved toward the right, the container contents also moves toward the right.

During the aforementioned rightward movement of the piston rods 86 and 94 of the cylinders 76 and 80, respectively, the cylinders 78 and 82 are opened to exhaust so that their respective piston rods 90 and 96 may retract when their pusher arms 92 and 100 are engaged by the rightward moving beams 72 and 74.

At the end of the rightward extension of piston rods 86 and 94, cylinder 78 is activated to extend its piston rod 90 while hydraulic fluid pressure is closed to cylinders 80 and 82 so as to secure the slats 70 against movement. Accordingly, beam 72 and its associated slats 68 are moved toward the left in FIG. 5 in the slat-retracting direction, while beam 74 and its associated slats 70 remain stationary with the fixed slats 66. During this retraction of slats 68 the container contents remain stationary on the conveyor because of the greater area of the stationary slats 66 and 70.

When slats 68 are fully retracted, cylinder 82 is activated to extend its piston rod 96 toward the left, while companion cylinder 80 is opened to exhaust and both cylinders 76 and 78 are closed to hydraulic fluid pressure. Slats 70 thus move toward the left to their fully retracted position, while the container contents remains stationary.

With full retraction of slats 68 and 70, the foregoing cycle of operation is repeated sequentially to effect off-loading of the container contents.

If desired, the pusher arms may be adjusted from their vertical orientation illustrated in FIGS. 6 and 7 to a horizontally retracted position, to enable use of the underlying support frame as a support for a conventional container not provided with a reciprocating conveyor floor. This may be effected by the arrangement illustrated in FIGS. 8-10.

Figure 8:
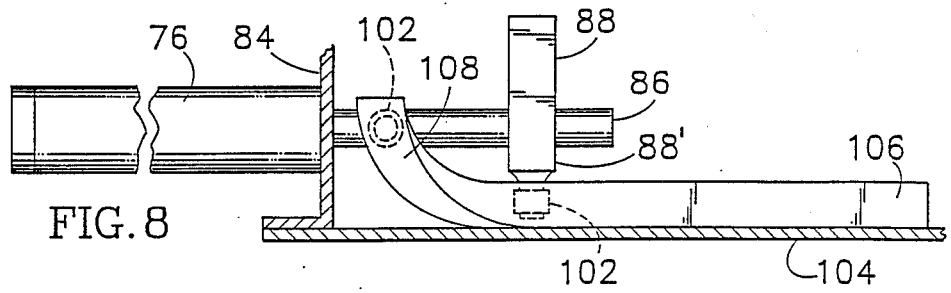
FIG. 8 is a fragmentary side elevation showing adjustment mechanism for use with the drive mechanism of FIG. 6 for retracting the pusher arms when not in use.
Figure 9:
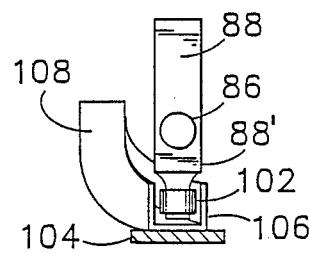
FIG. 9 is an end elevation of the mechanism of FIG. 8, as viewed from the right in FIG. 8.

Referring primarily to FIG. 8, one of the hydraulic cylinders, for example cylinder 76, is shown with its piston rod 86 in the retracted position relative to its associated slat connector and drive beam 72 (FIG. 6). The pusher arm 88 is still in vertically extending, operative position by virtue of the arm having an extension 88' projecting downward from the piston rod and having on its terminal end a cam follower element 102. This cam follower element is confined freely in an elongated track of U-shaped cross-section. The track is mounted on a support plate 104 which extends between and is secured to adjacent transverse support frame members 84.

The elongated portion 106 of the track extending longitudinally outward from the retracted but operative position of the pusher arm 88 is linear. Accordingly the pusher arm remains in vertical position throughout its operative range, to move the beam 72 to its full limit of rightward extension toward the companion, retracted pusher arm 92.

Figure 10:
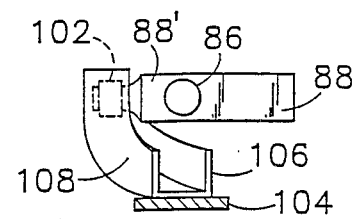
FIG. 10 is an end elevation similar to FIG. 9 but showing the pusher arm in horizontal, retracted position.

The inward portion 108 of the track extends arcuately rearward and upward to one lateral side of the linear portion 106, to guide the cam follower 102 arcuately rearward and upward as the piston rod 86 and hence the pusher arm 88 is retracted further toward the cylinder 76. During this retraction the pusher arm 88 is rotated 90' from the vertically upward, operative position to a horizontal, retracted position, as illustrated in FIG. 10. This rotation is accompanied by corresponding rotation of the piston rod 86 and its attached piston within the cylinder 76.

The operation of the detachable conveyor system illustrated in FIGS. 5-7 is similar to the embodiment of FIGS. 1-4, as will be apparent. The installation of the conveyor on the underlying support is accomplished by first retracting all of the piston rods 86, 90, 94 and 96 so that maximum spacing is provided between companion pusher arms 88, 92 and 98, 100. The detached conveyor then may be placed upon the support, with the slat connector and drive beams 72 and 74 properly located between their associated pusher arms.

In the event the support frame is to be used to support a conventional container which does not have a reciprocating conveyor floor, the cylinders 76, 78, 80 and 82 are activated to retract the piston rods further inward from their normally retracted, operative position, to cause the cam followers 102 to move through the curved rear portion 108 of the guide track. Pusher arms thus are rotated from the vertically projecting, operative position shown in FIGS. 5-9 to the horizontally retracted position shown in FIG. 10.

From the foregoing, it will be apparent that this invention provides effective means for detachably mounting a reciprocative conveyor on an underlying stationary or mobile support, whereby a multiplicity of the conveyors may utilize the same support and conveyor floor drive mechanism. This arrangement advantageously avoids the complications and costs of duplicating the drive mechanism on each conveyor.

It will be apparent to those skilled in the art that various changes may be made in the size, shape, type, number and arrangement of parts described hereinbefore, without departing from the spirit of this invention and the scope of the appended claims.

I claim:
1. A reciprocating conveyor, comprising:
   (a) an elongated conveyor frame,
   (b) a plurality of groups of elongated load-supporting slats mounted to and forming the load-supporting and load-moving bottom of the conveyor frame, the slats being arranged for selective simultaneous and independent longitudinal reciprocation in load-moving and slat-retracting directions, respectively, (c) an elongated support frame arranged to detachably mount the elongated conveyor frame, and (d) a plurality of slat drive means secured to the support frame and each arranged to releasably engage one of the groups of reciprocative slats for reciprocating them, whereby when the conveyor frame is detached from the support frame the plurality of slat drive means remain with the support frame.

2. The reciprocating conveyor of claim 1 wherein the elongated support frame includes legs for supporting the support frame in the stationary position.

3. The reciprocating conveyor of claim 1 wherein the elongated support frame comprises a part of the wheeled chassis of a trailer.

4. The reciprocating conveyor of claim 1 wherein each group of elongated load-supporting slats includes a plurality of slats spaced apart laterally across the conveyor frame and connected together by a transverse connector member.

5. The reciprocating conveyor of claim 4 wherein the slat drive means includes fluid pressure drive mechanisms releasably engaging each transverse connector member for reciprocating the connector member and the slats connected thereto.

6. The reciprocating conveyor of claim 5 wherein each slat drive means includes a fluid pressure piston-cylinder unit having a piston rod projecting from the cylinder of the unit, and means on the piston rod releasably engaging the transverse connector member for moving the latter.

7. The reciprocating conveyor of claim 6 wherein the releasably engaging means on the piston rod includes a resiliently retractable pin member detachably engaging a socket member on the transverse connector member.

8. The reciprocating conveyor of claim 6 wherein the releasably engaging means on the piston rod includes a pusher arm extending perpendicularly from the piston rod to abut the transverse connector member.

9. The reciprocating conveyor of claim 8 including means engaging the pusher arm for moving it from the connector member-abutting position to a retracted position away from the connector member.

10. The reciprocating conveyor of claim 9 wherein the means engaging the pusher arm includes a cam follower member on the pusher arm member and a guide member on the support frame engaging the cam follower member and configured to move the pusher arm between said connector member-abutting and retracted positions.

11. The reciprocating conveyor of claim 4 wherein the slat drive means includes a pair of fluid pressure piston-cylinder units for each connector member each having a piston rod projecting from the cylinder of the unit, and a pusher arm extending perpendicularly from each piston rod, the pusher arms of the pair being disposed on opposite sides of the associated transverse connector member for abutting opposite sides of the connector member for pushing said connector member in opposite directions.

12. The reciprocating conveyor of claim 11 including means engaging each pusher arm for moving it from the connector member-abutting position to a retracted position away from the connector member.

13. The reciprocating conveyor of claim 12 wherein the means engaging each pusher arm includes a cam follower member on the pusher arm, and a guide member on the support frame engaging the cam follower member and configured to move the pusher arm between said connector member-abutting and retracted positions.

14. The reciprocating conveyor of claim 1 wherein (a) each group of elongated load-supporting slats includes a plurality of slats spaced apart laterally across the conveyor frame and connected together by a transverse connector member, (b) the slat drive means includes a fluid pressure piston-cylinder unit for each connector member having a piston rod projecting from the cylinder of the unit, and means on the piston rod releasably engaging the transverse connector member for moving the latter, (c) the releasably engaging means on the piston rod includes a resiliently retractable pin member detachably engaging a socket member on the transverse connector member.

15. The reciprocating conveyor of claim 1 wherein (a) each group of elongated load-supporting slats includes a plurality of slats spaced apart laterally across the conveyor frame and connected together by a transverse connector member, and (b) the slat drive member includes a pair of fluid pressure piston-cylinder units for each connector member each having a piston rod projecting from the cylinder of the unit, and a pusher arm extending perpendicular from each piston rod, the pusher arms of the pair being disposed on opposite sides of the associated transverse connector member for abutting opposite sides of the connector member for pushing said connector member in opposite direction.

16. The reciprocating conveyor of claim 15 including means engaging each pusher arm for moving it from the connector member-abutting position to a retracted position away from the connector member.

17. The reciprocating conveyor of claim 16 wherein the means engaging each pusher arm includes a cam follower member on the pusher arm, and a guide member on the support frame engaging the cam follower member and configured to move the pusher arm between said connector member-abutting and retracted positions.

* * * * *